（12）United States Patent
Wakumoto et al.

(10) Patent No.: US 7,382,734 B2
(45) Date of Patent: Jun. 3, 2008

(54) DIRECTING A PATH VERIFICATION REQUEST ALONG A SPECIFIC PATH TO A MESH NETWORK SWITCH TO TEST OPERABILITY OF THE SPECIFIC PATH

(75) Inventors: Shaun Kazuo Wakumoto, Roseville, CA (US); Ballard Claude Bare, Auburn, CA (US); Cetin Ersoy, Portsmouth, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 786 days.

(21) Appl. No.: 10/850,226

(22) Filed: May 20, 2004

(65) Prior Publication Data

US 2005/0259587 A1    Nov. 24, 2005

(51) Int. Cl.
*H04L 12/26* (2006.01)
(52) U.S. Cl. .................. 370/248; 370/389; 370/254
(58) Field of Classification Search .................. None
See application file for complete search history.

(56) References Cited

U.S. PATENT DOCUMENTS

| | | | |
|---|---|---|---|
| 5,237,565 A | 8/1993 | Henrion et al. | |
| 5,519,698 A | 5/1996 | Lyles et al. | |
| 5,532,692 A | 7/1996 | Tatsuya | |
| 5,541,914 A | 7/1996 | Krishnamoorthy et al. | |
| 5,586,116 A | 12/1996 | Hofestadt et al. | |
| 5,602,844 A | 2/1997 | Lyles | |
| 6,055,561 A | 4/2000 | Feldman et al. | |
| 6,061,363 A | 5/2000 | Evans et al. | |
| 6,130,889 A | 10/2000 | Feldman et al. | |
| 6,212,628 B1 | 4/2001 | Abercrombie et al. | |
| 6,269,099 B1 | 7/2001 | Borella et al. | |
| 6,301,257 B1 | 10/2001 | Johnson et al. | |
| 6,374,303 B1 | 4/2002 | Armitage et al. | |
| 6,493,318 B1 * | 12/2002 | Bare | ......................... 370/238 |
| 6,529,958 B1 | 3/2003 | Oba et al. | |
| 6,538,997 B1 * | 3/2003 | Wang et al. | ................. 370/241 |
| 6,556,541 B1 | 4/2003 | Bare | |
| 6,577,600 B1 | 6/2003 | Bare | |
| 6,580,715 B1 | 6/2003 | Bare | |
| 6,611,526 B1 | 8/2003 | Chinnasywamy et al. | |
| 6,631,415 B1 | 10/2003 | James et al. | |
| 6,647,017 B1 | 11/2003 | Heiman | |
| 6,667,959 B1 | 12/2003 | Hebb et al. | |
| 6,697,359 B1 | 2/2004 | George | |
| 6,952,421 B1 * | 10/2005 | Slater | ......................... 370/401 |
| 2004/0218542 A1 * | 11/2004 | Lee | ............................ 370/248 |
| 2005/0099948 A1 * | 5/2005 | Wakumoto et al. | ......... 370/236 |

\* cited by examiner

*Primary Examiner*—Frank Duong

(57) ABSTRACT

An apparatus in one example comprises a first mesh network switch that directs a path verification request along a specific path to a second mesh network switch to test operability of the specific path.

30 Claims, 2 Drawing Sheets

DIRECTING A PATH VERIFICATION REQUEST ALONG A SPECIFIC PATH TO A MESH NETWORK SWITCH TO TEST OPERABILITY OF THE SPECIFIC PATH

CROSS-REFERENCE TO RELATED APPLICATION

This application contains subject matter that is related to the subject matter of the following application, which is assigned to the same assignee as this application. The below-listed application is hereby incorporated herein by reference in its entirety:

"DETERMINATION OF A PLURALITY OF PATHS BEFORE SELECTION OF ONE PATH OF THE PLURALITY OF PATHS FOR TRANSMISSION OF ONE OR MORE PACKETS," by Wakumoto, et al., co-filed herewith.

BACKGROUND

Mesh networks comprise a plurality of interconnected mesh network switches. Each of the mesh network switches has one or more available paths to each of the other mesh network switches. A first mesh network switch may send a data packet to any of the other mesh network switches. For example, the data packet may travel along any one of the available paths from the first mesh network switch to a second mesh network switch.

The first and second mesh network switches exchange meshing cost protocol packets to test the available paths between the first and second mesh network switches. The meshing cost protocol packets test the performance of each path, such as the number of hops in the path, link speed of the path, and the like. In one example, the first and second mesh network switches periodically exchange the meshing cost protocol packets to periodically determine the cost of each path. The first and second mesh network switches in one example exchange the meshing cost protocol packets every thirty seconds. In another example, the first network switches and second mesh network switches exchange the meshing cost protocol packets upon a change in the mesh network. After sending the meshing cost protocol packets, the first mesh network switch determines one path of the available paths that has the lowest cost (e.g., highest performance) based on the results of the meshing cost protocol packets. If the first mesh network switch sends a data packet to the second mesh network switch during a specific interval, then the first mesh network switch employs the one path that has the lowest cost during that specific interval.

If the one path that has the lowest cost during that specific interval fails, then the first and second mesh network switches in one example must again exchange cost packets through each of the available paths between the first and second mesh network switches to find a substitute path that has the lowest cost. The first mesh network switch then may send a data packet to the second mesh network switch along the substitute path that now has the lowest cost during that specific interval.

SUMMARY

The invention in one implementation encompasses an apparatus. The apparatus comprises a first mesh network switch that directs a path verification request along a specific path to a second mesh network switch to test operability of the specific path.

Another implementation of the invention encompasses a method. A path verification request is directed along a specific path to a mesh network switch to trigger a path verification acknowledgement from the mesh network switch back along the specific path.

The invention in another implementation comprises an apparatus. The apparatus comprises means for determining a plurality of paths to a mesh network switch. The apparatus comprises means for directing a path verification request along a specific path of the plurality of paths through one or more mesh network switches that comprise the mesh network switch to verify whether path connection information of the path verification request is correct.

The invention in yet another implementation comprises an article. The article comprises one or more computer-readable signal-bearing media. The article comprises means in the one or more media for directing a path verification request along a specific path to a mesh network switch to trigger a path verification acknowledgement from the mesh network switch back along the specific path.

DESCRIPTION OF THE DRAWINGS

Features of exemplary implementations of the invention will become apparent from the description, the claims, and the accompanying drawings in which:

DETAILED DESCRIPTION

Referring to the BACKGROUND section above, the first mesh network switch employs the one path that has the lowest cost during the specific interval for transmission of data packets to the second mesh network switch. The first mesh network switch in one example only knows which forwarding port to use to send out the data packet to the second mesh network switch. The first mesh network switch is unable to determine the entire path that the data packet will take through the mesh network to the second mesh network switch. During the specific interval, the first mesh network switch is unable to verify whether the one path is still operable. For example, after the results of the cost packets indicated that the one path has the lowest cost, a link in the one path may have failed. As one shortcoming, the first mesh network switch is unable to determine whether the one path is operable before sending data packets over the one path.

Figure 1:
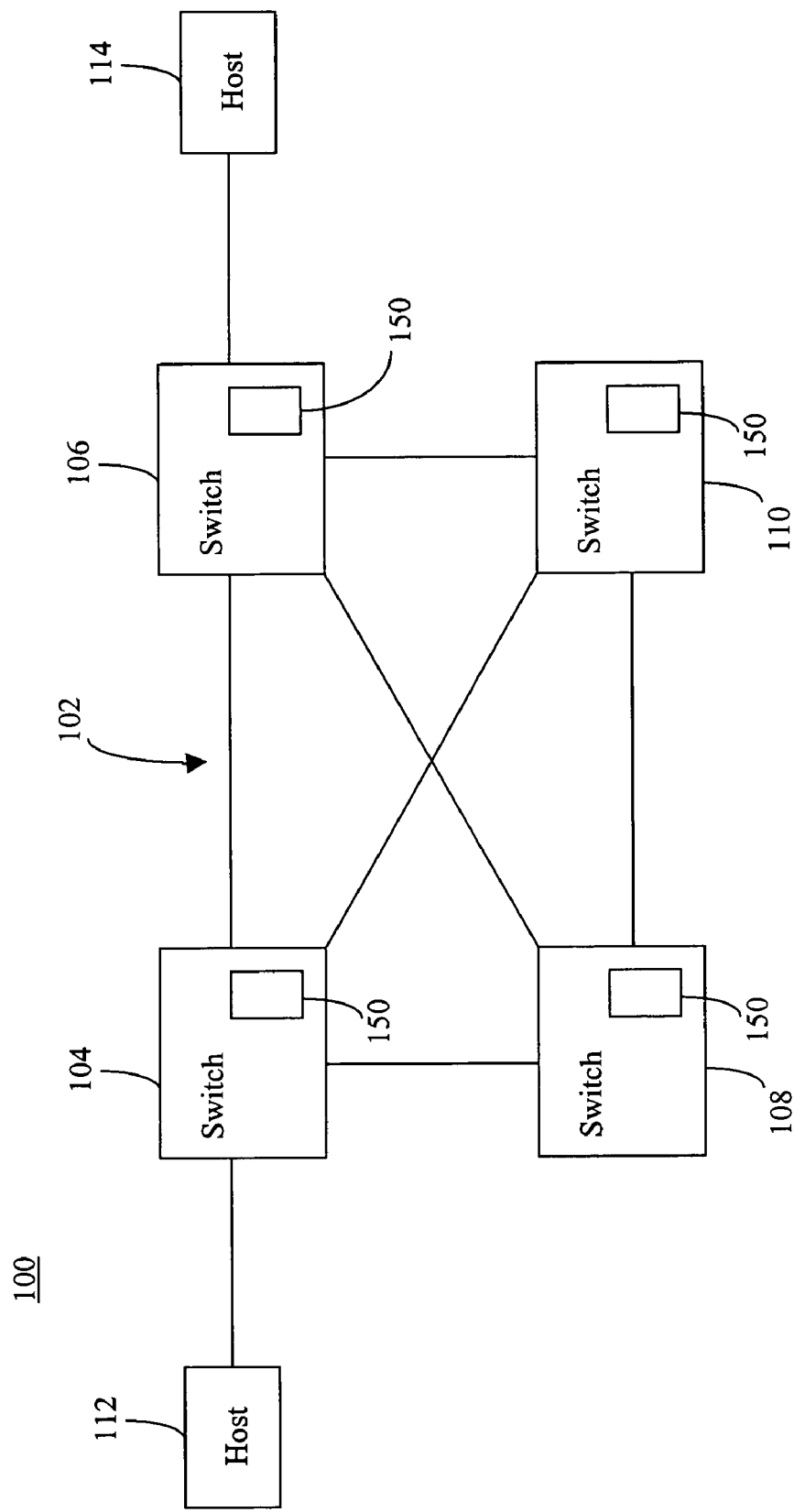
FIG. 1 is a representation of an exemplary implementation of an apparatus that comprises a plurality of mesh network switches.

Turning to FIG. 1, an apparatus 100 in one example comprises one or more mesh networks 102. The mesh network 102 in one example comprises a plurality of mesh network switches 104, 106, 108, and 110. The mesh network switches 104, 106, 108, and 110 in one example connect a plurality of hosts 112 and 114 that reside outside of the mesh network 102.

Each of the mesh network switches 104, 106, 108, and 110 in one example has one or more available paths to each of the other mesh network switches 104, 106, 108, and 110. The mesh network switch 104 is able send a packet to any of the mesh network switches 106, 108, and 110. The packet in one example comprises a data packet. The packet may to travel along any selected path of the available paths from the mesh network switch 104 to the mesh network switch 106. For example, the mesh network switch 104 specifies a path for the packet to travel along to the mesh network switch 106.

The mesh network switch 104 directs the packet along a specific path to the mesh network switch 106. For example, the mesh network switch 104 inserts a mesh tag associated with the specific path into the packet while the packet is in the mesh network 102. The mesh network switch 104 employs the mesh tag to route the packet along the specific path to the mesh network switch 106. Upon receipt of the packet, the mesh network switch 106 strips off the mesh tag and forwards the packet out of the mesh network 102 on one or more non-mesh ports.

The mesh tag associated with the specific path between the mesh network switch 104 and the mesh network switch 106 comprises a unique identifier of the mesh network switch 104 (e.g., source switch identifier), a unique identifier of the mesh network switch 106 (e.g., destination switch identifier), and a unique identifier of the specific path. The mesh tag may comprise any number of bits to uniquely represent a specific path through the mesh network 102. The mesh tag in one example comprises a 16-bit tag added to a packet to direct the packet along a specific path. For example, the unique identifier of the mesh network switch 104 is a 6-bit field, the unique identifier of the mesh network switch 106 is a 6-bit field, and the unique identifier of the specific path is a 4-bit field. Other exemplary embodiments of the mesh tag employ bit fields of various sizes.

The mesh network switch 104 in one example is assigned the 6-bit unique identifier of 000001. The mesh network switch 106 in one example is assigned the 6-bit unique identifier of 000010. A first path between the mesh network switch 104 and the mesh network switch 106 in one example is assigned the 4-bit unique identifier of 0001. So, the 16-bit mesh tag for the first path between the mesh network switch 104 and the mesh network switch 106 would be 0000010000100001 (i.e., 0x0421). A second path between the mesh network switch 104 and the mesh network switch 106 in one example is assigned the 4-bit unique identifier of 0010. So, the 16-bit mesh tag for the second path between the mesh network switch 104 and the mesh network switch 106 would be 0000010000100010 (i.e., 0x0422).

In one example, to determine the 6-bit unique identifier of the mesh network switches 104, 106, 108, and 110, the mesh network switches 104, 106, 108, and 110 employ a switch identification negotiation protocol. Upon initialization, the mesh network switches 104, 106, 108, and 110 negotiate a 6-bit unique identifier with each of the other mesh network switches 104, 106, 108, and 110. Each of the mesh network switches 104, 106, 108, and 110 in the mesh network 102 in one example have a 6-bit identifier between zero and sixty-three. If a new mesh network switch enters the mesh network 102, the new mesh network switch will negotiate for a 6-bit identifier that is not currently being used by one of the mesh network switches 104, 106, 108, and 110 in the mesh network 102. In another example, the 6-bit identifiers of the mesh network switches 104, 106, 108, and 110 are user-configurable. For example, a user will set a unique 6-bit identifier for each of the 6-bit identifiers.

Once the mesh network switch 104 has negotiated and been assigned a switch identifier, the mesh network switch 104 can start to broadcast mesh connection information packets to the mesh network switches 106, 108, and 110. The mesh connection information packets in one example comprise the switch identifier of the mesh network switch 104, a number of mesh links of the mesh network switch 104, port numbers of the mesh network switch 104, neighbor mesh network switch information, and neighbor mesh network switch port numbers. The mesh network switch 104 informs the mesh network switches 106, 108, and 110 about the mesh connection information of the mesh network switch 104. The mesh network switches 106, 108, and 110 employ the mesh connection information of the mesh network switch 104 as a topology update and may forward the mesh connection information packets out to other mesh network switches. The mesh network switches 106, 108, and 110 can employ the mesh connection information of the mesh network switch 104 to determine paths through the mesh network 102 to the mesh network switches 106, 108, and 110. The mesh network switches 106, 108, and 110 broadcast analogous mesh connection information to the other mesh network switches 104, 106, 108, and 110.

A 4-bit value in one example represents the unique identifier of the specific path. So, the 4-bit digit value, combined with the source switch identifier and the destination switch identifier, is able to uniquely identify up to sixteen different paths between any two of the mesh network switches 104, 106, 108, and 110 within the mesh network 102. To determine the 4-bit unique identifier of the specific path from the mesh network switch 104 to the mesh network switch 106, the mesh network switch 104 determines a plurality of selected paths from a plurality of available paths between the mesh network switch 104 and the mesh network switch 106. In one example, the plurality of selected paths comprises a subset of the plurality of available paths. In another example, the plurality of selected paths comprises all of the plurality of available paths. The mesh network switches 104, 106, 108, and 110 in one example predetermine a sub-portion of the sixteen unique path identifiers. During operation, the mesh network switches 104, 106, 108, and 110 may find a need to use the remainder of the sixteen unique path identifiers. For example, if one of the predetermined paths fails, then the mesh network switches 104, 106, 108, and 110 quickly determine a new path and assign one of the remaining unique path identifiers to the new path.

The mesh network switch 104 employs mesh connection information of one or more of the mesh network switches 104, 106, 108, and 110 to determine the plurality of selected paths before a selection of one path of the plurality of selected paths for transmission of one or more packets from the mesh network switch 104 to the mesh network switch 106.

The mesh connection information in one example comprises a topology map of the mesh network 102. The mesh network switch 104 stores the connections each of the mesh network switches 104, 106, 108, and 110 has with each of the other mesh network switches 104, 106, 108, and 110. For example, the mesh network switch 104 knows of a first port connection with the mesh network switch 106, a second port connection with the mesh network switch 108, and a third port connection with the mesh network switch 110. The mesh network switch 104 also knows that the mesh network switch 108 has a first port connection with the mesh network switch 104, a second port connection with the mesh network switch 106, and a third port connection with the mesh network switch 110. The mesh network switch 104 also knows the mesh connection information of the mesh network switch 106 and 110. So, the mesh network switch 104 is able to determine and set-up a plurality of paths to each of the mesh network switches 106, 108, and 110. For example, the mesh network switch 104 sets a unique 4-bit path identifier for each of the plurality of paths to each of the mesh network switches 106, 108, and 110.

The mesh network switch 104 may store the unique 4-bit path identifier for each of the plurality of paths in a list and/or database of path identifiers. To send a packet to the mesh network switch 106, the mesh network switch 104 selects, from the list, one of the 4-bit identifiers associated with a specific path between the mesh network switch 104 and the mesh network switch 106.

The mesh network switch 104 may organize the list based on one or more criteria. For example, the mesh network switch 104 may rank the plurality of paths between the mesh network switch 104 and the mesh network switch 106 based on one or more performance or latency characteristics, such as number of hops, port queue depths, link speed, and/or port packet drop rate. In another example, the list may be user-configurable. A user may specify the ranking of the plurality of paths. The mesh network switch 104 may reserve low latency paths for time sensitive packets, such as voice or video traffic. The mesh network switch 104 may also reserve higher latency paths for lower priority traffic. The mesh network switch 104 periodically tests the plurality of available paths between the mesh network switch 104 and the mesh network switch 106 to determine whether the plurality of selected paths are preferred over unused paths of the plurality of available paths. The mesh network switch 104 may reorganize the list if necessary. For example, if some paths are getting over used, the mesh network switches 104, 106, 108, and 110 could use another mesh tag associated with another predetermined path to carry packets.

When one of the mesh network switches 104, 106, 108, and 110 learns of a path to another of the mesh network switches 104, 106, 108, and 110, one of the mesh network switches 104, 106, 108, and 110 then forms the path to the other of the mesh network switches 104, 106, 108, and 110 using a path generation packet. For example, the mesh network switch 104 assigns a unique mesh tag to the path to the mesh network switch 106. The mesh network switch 104 sends the path generation packet along the path through any hop switches to the mesh network switch 106 to inform the hop switches and the mesh network switch 106 of the path. Hop switches comprise any switches between the source switch and destination switch in the mesh network 102. For example, a hop switch is an intermediary along a given path through the mesh network 102.

The 4-bit path identifier of the mesh tag allows each switch of the mesh network switches 104, 106, 108, and 110 to predetermine up to sixteen redundant unicast paths to each of the other mesh network switches 104, 106, 108, and 110. Each switch in one example fills twelve or less of the sixteen redundant unicast paths. So, upon a failure of one or more of the redundant unicast paths, the mesh network switches 104, 106, 108, and 110 can employ one or more of the remaining unassigned unique path identifiers to determine and save new paths.

Upon receipt of the path generation packet at a receiving switch of the mesh network switches 104, 106, 108, and 110, the receiving switch sends an acknowledgement packet back to a hop switch of the mesh network switches 104, 106, 108, and 110 that forwarded the path generation packet. The receiving switch stores the path information in software tables and programs the mesh tag and forwarding port in hardware of the receiving switch.

If the hop switch does not receive the acknowledgement packet within a predetermined amount of time, then the hop switch informs a source switch of the mesh network switches 104, 106, 108, and 110 that the path is no longer valid. For example, the hop switch sends a path invalid packet to the source switch. The source switch will invalidate the specific mesh tag and send out a path removal packet along the path. The mesh network switches 104, 106, 108, and 110 have predetermined redundant paths that are somewhat different from one another between the other mesh network switches 104, 106, 108, and 110. So, a single link failure is unlikely to invalidate many of the predetermined redundant paths.

Each of the mesh network switches 104, 106, 108, and 110 in one example may store up to 16 (e.g., based on a 4-bit path identifier) broadcast paths to the other mesh network switches 104, 106, 108, and 110. For example, if the destination switch identifier of the mesh tag is set to zero, then the mesh tag represents a broadcast path for the switch of the mesh network switches 104, 106, 108, and 110 associated with the source switch identifier. The broadcast path comprises a set of paths from the source switch of the mesh network switches 104, 106, 108, and 110 to all the other mesh network switches 104, 106, 108, and 110.

The mesh network switches 104, 106, 108, and 110 determine a plurality of redundant broadcast paths. For example, each of the mesh network switches 104, 106, 108, and 110 pre-builds a plurality of broadcast paths to the other mesh network switches 104, 106, 108, and 110. Upon failure of one of the plurality of broadcast paths, the mesh network switches 104, 106, 108, and 110 may use a different mesh tag associated with a different broadcast path of the plurality of broadcast paths. The mesh network switches 104, 106, 108, and 110 generate the plurality of broadcast paths analogously to the plurality of unicast paths.

The mesh network switches 104, 106, 108, and 110 predetermine a plurality of redundant paths between other mesh network switches 104, 106, 108, and 110. For example, the mesh network switch 104 predetermines a plurality of redundant paths to the mesh network switch 106. The mesh network switch 104 stores a list of the plurality of unique mesh tags associated with the plurality of redundant paths. The mesh network switch 104 in one example employs a first path of the plurality of redundant paths to send one or more first packets to the mesh network switch 106. Upon a determination to not use the first path for one or more second packets, the mesh network switch 104 selects a second path of the plurality of redundant paths for transmission of the one or more second packets to the mesh network switch 106. For example, upon failure of a link in the first path, the mesh network switch 104 inserts a mesh tag associated with the second path into the one or more second packets to route the one or more second paths along the second path. In one example, the one or more second packets are the one or more first packets with the mesh tag of the second path substituted for the mesh tag of the first path. In another example, the one or more second packets have different data payloads than the one or more first packets. The mesh network switch of the mesh network switches 104, 106, 108, and 110 that determines the failure of the link in the first path, inserts the mesh tag associated with the second path into the one or more second packets and propagates the one or more second packets to the mesh network switch 106.

The mesh network switch 104 in one example may want to verify the operability of a specific path of the plurality of redundant paths to the mesh network switch 106 before sending data packets along the specific path. The mesh network switch 104 in one example is considered the owner mesh network switch for the specific path. For example, the mesh network switch 104 initiates packet transmission over the specific path. The mesh network switch 104 is considered the owner mesh network switch for each of the plurality of redundant paths to the mesh network switch 106 and for any other predetermined paths to the mesh network switches 108 and 110. The mesh network switches 106, 108, and 110 are considered the owner mesh network switches for the predetermined paths that are under the control of the respective mesh network switches 106, 108, and 110. For example, each of the mesh network switches 104, 106, 108, and 110 are considered the owner mesh network switch for a group of paths.

To test operability of the specific path from the mesh network switch 104 to the mesh network switch 106, the mesh network switch 104 directs a path verification request along the specific path to the mesh network switch 106. The mesh network switch 104 sends the path verification request to trigger a path verification acknowledgement from the mesh network switch 106 to the mesh network switch 104 back along the specific path. For example, upon receipt of the path verification request, the mesh network switch 106 sends the path verification acknowledgement to the mesh network switch 104. Receipt of the path verification acknowledgement confirms to the mesh network switch 104 that the specific path is operational.

To direct the path verification request along the specific path, the mesh network switch 104 inserts a mesh tag into the path verification request. The mesh tag comprises unique identifier of the mesh network switch 104 (e.g., source switch identifier), a unique identifier of the mesh network switch 106 (e.g., destination switch identifier), and a unique identifier of the specific path. Each mesh network switch of the mesh network switches 106, 108, and 110 looks at the unique identifier of the specific path to determine along which path (e.g., forwarding port) to propagate the path verification request. The path verification request tests the mesh tag to confirm that the mesh tag correctly directs the path verification request along the specific path to the mesh network switch 106.

The specific path in one example starts at the mesh network switch 104, passes through the mesh network switches 108 and 110, and ends at the mesh network switch 106. So, to test the operability of the specific path, the mesh network switch 104 directs the path verification request along the specific path to the mesh network switch 108. The mesh network switch 108 verifies whether path connection information of the path verification request is correct. For example, the mesh network switch 108 compares the path connection information of the path verification request with path connection information stored in one or more forwarding tables. The mesh network switch 108 verifies whether the path connection information of the path verification request matches outgoing port information stored by the mesh network switch 108 in the forwarding tables.

If the mesh network switch 108 determines that the path connection information of the path verification request is correct, then the mesh network switch 108 directs the path verification request along the specific path to the mesh network switch 110. The mesh network switch 110 tests of the path connection information of the path verification request and the path connection information of the forwarding tables, analogously to the mesh network switch 108, as described herein. If the mesh network switch 110 determines that the path connection information of the path verification request is correct, then the mesh network switch 110 sends the path verification request along the specific path to the mesh network switch 106.

If either of the mesh network switches 108 and 110 determines that the path connection information of the path verification request is incorrect, then one or more of the mesh network switches 108 and 110 send an invalid path response to the mesh network switch 104. The invalid path response indicates non-operability of the specific path. Upon receipt of the invalid path response, the mesh network switch 104 in one example discontinues use of the specific path for transmission of data packets to the mesh network switch 106. For example, the mesh network switch 104 selects another path from the plurality of predetermined redundant paths for transmission of the data packets to the mesh network switch 106.

Upon receipt of the invalid path response, the mesh network switch 104 in one example broadcasts a path removal packet to the mesh network switches 106, 108, and 110. The mesh network switch 104 employs one of the predetermined broadcast paths or floods the path removal packet into the mesh network 102 to the mesh network switches 106, 108, and 110 since the specific path may no longer be operational. The path removal packet indicates to the mesh network switches 106, 108, and 110 to remove the unique identifier of the specific path from one or more mesh forwarding tables. For example, the path removal packet deletes the specific path from the list of the predetermined redundant paths to the mesh network switch 106.

In one example, the mesh network switch 104 in one example directs the path verification request along the specific path to test whether a link in the specific path has failed. In another example, the mesh network switch 104 directs the path verification request along the specific path to test whether the specific path passes through any of the mesh network switches 106, 108, and 110 more than once. For example, the mesh network switch 104 sends the path verification request to determine whether the specific path has a loop. If one of the mesh network switches 106, 108, and 110 receives the same path verification request more than once, then the one of the mesh network switches 106, 108, and 110 notifies the mesh network switch 104 that the specific path has a loop.

In one example, the mesh network switch 104 initiates the path verification request upon determination that a need for path verification exists. In another example, the mesh network switch 104 periodically sends path verification requests along the specific path to the mesh network switch 106 to periodically test operability of the specific path. For example, the mesh network switch 104 may employ a timer to control path verification. The timer may periodically instruct the mesh network switch 104 to send path verification request along the specific path or any other path to one of the mesh network switches 106, 108, and 110.

The mesh network switch 104 in one example sends path verification requests along other paths of the plurality of redundant paths to the mesh network switch 106 and along specific paths to the mesh network switches 108 and 110 to test operability of the other paths. The path verification requests along other paths are analogous to the path verification request along the specific path to the mesh network switch 106, as described herein. The mesh network switches 106, 108, and 110 also may send path verification requests to the other mesh network switches 104, 106, 108, and 110 to test operability of the paths to the other mesh network switches 104, 106, 108, and 110. For example, any one of the mesh network switches 104, 106, 108, and 110 may direct a path verification request along a specific path to any other one of the mesh network switches 104, 106, 108, and 110 to test operability of that specific path.

In one example, the path verification request tests operability of the specific path. For example, the path verification request tests whether the specific path is able to carry a data packet to the mesh network switch 106. In another example, the path verification request tests both the operability of the specific path and performance characteristics of the specific path. The mesh network switch 106 in one example sends the performance results of the specific path to the mesh network switch 104 in the path verification acknowledgement. The path verification request may test a number of hops in the specific path, link speed of the specific path, latency of the specific path, and/or the like.

In one example, the path verification request tests the operability of a unicast path between one of the mesh network switches 104, 106, 108, and 110 and another of the mesh network switches 104, 106, 108, and 110. In another example, the path verification request tests the operability of a broadcast path between one of the mesh network switches 104, 106, 108, and 110 and all of the other mesh network switches 104, 106, 108, and 110. For example, the mesh network switch 104 predetermines a plurality of redundant broadcast paths to the mesh network switches 106, 108, and 110. The mesh network switch 104 may send a broadcast path verification request to each of the mesh network switches 106, 108, and 110 on a specific broadcast path of the plurality of redundant broadcast paths. The broadcast path verification requests serve to test the operability of the specific broadcast path.

An example of a first broadcast path from the mesh network switch 104 to each of the mesh network switches 106, 108, and 110 comprises a first path to the mesh network switch 108, a second path to the mesh network switch 106, and a third path to the mesh network switch 110 through the mesh network switch 106. To test the first broadcast path, the mesh network switch 104 directs a path verification request to the mesh network switch 106 and a path verification request to the mesh network switch 108. The mesh network switch 106 forwards the path verification request to the mesh network switch 110. If the path from the mesh network switch 106 to the mesh network switch 110 is valid, then the mesh network switch 110 sends a path verification acknowledgement to the mesh network switch 106. If the path between the mesh network switch 104 and the mesh network switch 106 is valid and the mesh network switch 106 has received the path verification acknowledgement from the mesh network switch 110, then the mesh network switch 106 sends a path verification acknowledgement to the mesh network switch 104. If the path between the mesh network switch 104 and the mesh network switch 108 is valid, then the mesh network switch 108 sends a path verification acknowledgment to the mesh network switch 104. If the mesh network switch 104 receives a path verification acknowledgement from each of the mesh network switches 106 and 108, then the mesh network switch 104 concludes that the first broadcast path is valid. For example, the first broadcast path is operable for transmission of data packets to the mesh network switches 106, 108, and 110. If the mesh network switch 104 does not receive a path verification acknowledgement from each of the mesh network switches 106 and 108 within a predetermined amount of time, then the mesh network switch 104 concludes that the first broadcast path is invalid.

An example of a second broadcast path from the mesh network switch 104 to each of the mesh network switches 106, 108, and 110 comprises a first path to the mesh network switch 106, a second path to the mesh network switch 108 through the mesh network switch 106, and a third path to the mesh network switch 110 through the mesh network switch 106. To test the second broadcast path, the mesh network switch 104 directs a path verification request to the mesh network switch 106. The mesh network switch 106 duplicates the path verification request and forwards a copy of the path verification request to each of the mesh network switches 108 and 110. If the paths from the mesh network switch 106 to the mesh network switches 108 and 110 are valid, then the mesh network switches 108 and 110 each send a path verification acknowledgement to the mesh network switch 106. If the path between the mesh network switch 104 and the mesh network switch 106 is valid and the mesh network switch 106 has received the path verification acknowledgements from the mesh network switches 108 and 110, then the mesh network switch 106 sends the path verification acknowledgements from each of the mesh network switches 108 and 110 to the mesh network switch 104. If the mesh network switch 104 receives both of the path verification acknowledgements from each of the mesh network switches 108 and 110 through the mesh network switch 106, then the mesh network switch 104 concludes that the second broadcast path is valid. For example, the second broadcast path is operable for transmission of data packets to the mesh network switches 106, 108, and 110. If the mesh network switch 104 does not receive a path verification acknowledgement from each of the mesh network switches 108 and 110 through the mesh network switch 106 within a predetermined amount of time, then the mesh network switch 104 concludes that the second broadcast path is invalid.

Upon determination that a path has failed, one or more of the mesh network switches 104, 106, 108, and 110 send out topology update packets. The topology update packets indicate which paths have failed and/or which paths are still valid. For example, upon the determination by the mesh network switch 104 that the link in the path has failed, the mesh network switch 104 sends updated mesh connection information to the other mesh network switches 106, 108, and 110 to indicate failure of the link.

The mesh network switches 104, 106, 108, and 110 employ the received topology update packets to update stored topology information and can recognize which paths are now invalid. The mesh network switches 104, 106, 108, and 110 in one example store a list of the plurality of redundant paths. Upon a determination that a link in a path has failed, the mesh network switches 104, 106, 108, and 110 in one example associate a flag with any path on the list that runs through the link. To transmit a packet to the mesh network switch 106, the mesh network switch 104 searches the list for a second path that is not associated with the flag. In another example, the mesh network switches 104, 106, 108, and 110 may re-tag the path to avoid the failed link. For example, the mesh network switches 104, 106, 108, and 110 may alter the path and the associated mesh tag to avoid the failed link.

Upon the determination that the first path has failed, one or more of the mesh network switches 104, 106, 108, and 110 send path removal packets to the other mesh network switches 104, 106, 108, and 110. The mesh network switches 104, 106, 108, and 110 in one example wait for five to ten seconds to send the path removal packets to prevent delayed packets from erroneously indicating failure of the first path. The path removal packets in one example indicate to the mesh network switches 104, 106, 108, and 110 to delete the mesh tag associated with the first path from the list of predetermined paths.

Packets may be assigned to paths based on one or more characteristics of the source, destination, or packet type. The mesh network switches 104, 106, 108, and 110 in one example had at first assigned one or more destination and/or source Media Access Control ("MAC") addresses to the path. For example, the packet may be assigned to a path based on the destination MAC address, source MAC address, or the combination of the destination and source MAC addresses of the packet. Upon failure of the path, the mesh network switches 104, 106, 108, and 110 re-assign one or more of the destination and/or source MAC addresses to a second path of the plurality of predetermined redundant paths.

Figure 2:
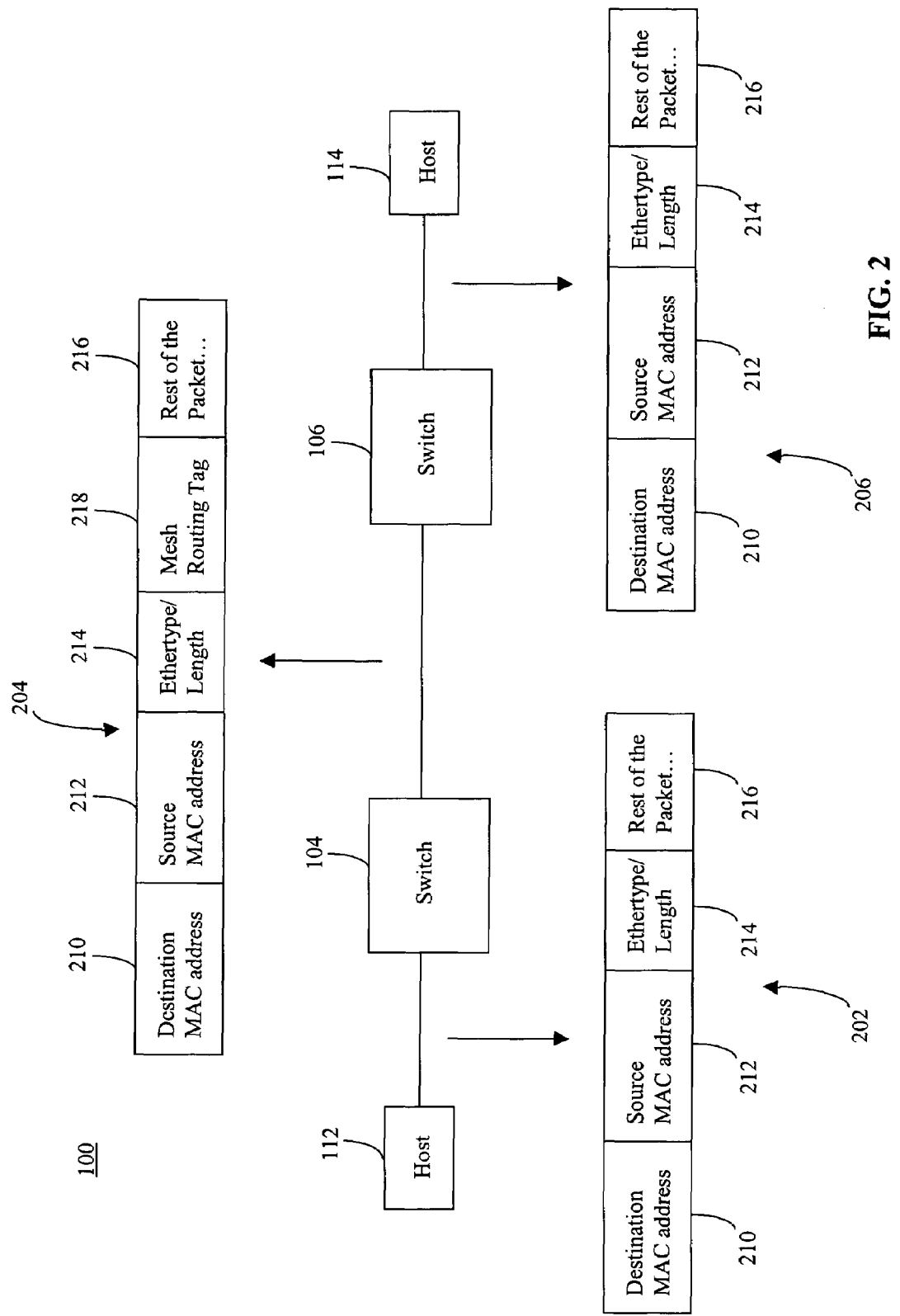
FIG. 2 is a representation of a transmission of a packet through a first mesh network switch and a second mesh network switch of the plurality of mesh network switches of the apparatus of FIG. 1.

Referring to FIG. 2, an illustrative description of one exemplary operation of the apparatus 100 is now presented, for explanatory purposes. The host 112 in one example sends a packet 202 into the mesh network 102 for delivery to the host 114. For example, the host 112 sends the packet 202 to the mesh network switch 104. The packet 202 comprises a destination Media Access Control ("MAC") address field 210, a source MAC address field 212, an Ethernet type and/or length ("Ethertype/length") field 214, and the rest of the packet 216.

The destination MAC address field 210 in one example carries the MAC address of the host 114. The source MAC address field 212 in one example carries the MAC address of the host 112. The Ethernet type and/or length ("Ethertype/length") field 214 carries Ethernet format information and/or packet length information. The rest of the packet 216 in one example carries additional header information and/or a data payload of the packet 202.

Upon receipt of the packet 202, the mesh network switch 104 inserts a mesh tag 218 into the packet 202 to create the packet 204. The mesh network switch 104 inserts the mesh tag 218 into the packet 202 at a position where the other mesh network switches 106, 108, and 110 can easily find the mesh tag 218. The mesh tag 218 comprises a unique identifier of the mesh network switch 104 (e.g., source switch identifier), a unique identifier of the mesh network switch 106 (e.g., destination switch identifier), and a unique identifier, of a path between the mesh network switch 104 and the mesh network switch 106. The mesh network switch 104 employs the unique identifier of the path to direct the packet 204 along a specific path through the mesh network 102 to the mesh network switch 106. The mesh network switch 104 selects the specific path from a list of a plurality of predetermined paths between the mesh network switch 104 and the mesh network switch 106.

The mesh network 102 looks at the unique identifier of the path to propagate the packet 204 to the mesh network switch 106. For example, if the path runs through one or more hop switches, such as the mesh network switch 108 (FIG. 1), then the hop switches check the unique identifier of the path from the mesh tag 218. The hop switches store a list of any of the unique identifiers of paths that run through the hop switches. For example, the hop switches store a list of the mesh tags associated with the plurality of predetermined paths between the mesh network switch 104 and the mesh network switch 106. So, the hop switches know how to propagate the packet 204 along the path based on the unique identifier of the path.

Upon receipt of the packet 204, the mesh network switch 106 removes the mesh tag 218 from the packet 204 to create the packet 206. The mesh network switch 106 then propagates the packet 206 to the MAC address located in the destination MAC address field 210. For example, the mesh network switch 106 sends the packet 206 to the host 114. The packet 206 is substantially similar to the packet 202. The packet 206 in one example is identical to the packet 202.

The apparatus 100 in one example comprises a plurality of components such as one or more of electronic components, hardware components, and computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art. The apparatus 100 in one example comprises any (e.g., horizontal, oblique, or vertical) orientation, with the description and figures herein illustrating one exemplary orientation of the apparatus 100, for explanatory purposes.

The apparatus 100 in one example employs one or more computer-readable signal-bearing media. An exemplary computer-readable signal-bearing medium for the apparatus 100 comprises the recordable data storage medium 150 of the mesh network switches 104, 106, 108, and 110. For example, the computer-readable signal-bearing medium for the apparatus 100 comprises one or more of a magnetic, electrical, optical, biological, and atomic data storage medium. In one example, the computer-readable signal-bearing medium comprises a modulated carrier signal transmitted over a network comprising or coupled with the apparatus 100, for instance, one or more of a telephone network, a local area network ("LAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An apparatus, comprising:
   a first mesh network switch that predetermines a plurality of redundant broadcast paths from the first mesh network switch to a plurality of mesh network switches;
   wherein the first mesh network switch replicates a broadcast path verification request and sends the broadcast path verification request along a specific broadcast path, of the plurality of redundant broadcast paths, to each of the plurality of mesh network switches to test operability of the specific broadcast path;
   wherein the first mesh network switch makes a determination that the specific broadcast path is valid as operable for transmission of data packets to the plurality of mesh network switches, upon receipt of a path verification acknowledgement within a predetermined amount of time from each of the plurality of mesh network switches in response to the broadcast path verification request;
   wherein the first mesh network switch makes a determination that the specific broadcast path is invalid as inoperable for transmission of data packets to the plurality of mesh network switches, upon failure of receipt of the path verification acknowledgement within the predetermined amount of time from any of the plurality of mesh network in response to the broadcast path verification request.

2. The apparatus of claim 1, wherein the first mesh network switch sends the broadcast path verification request to trigger a broadcast path verification acknowledgement from a second mesh network switch, of the plurality of mesh network switches, to the first mesh network switch back along the specific broadcast path.

3. The apparatus of claim 2, wherein receipt of the broadcast path verification acknowledgement by the first mesh network switch from the second mesh network switch within the predetermined amount of time indicates operability of the specific broadcast path.

4. The apparatus of claim 1, wherein the first mesh network switch directs a path verification request along the specific path to test whether the specific path passes through any mesh network switch, of the plurality of mesh network switches, more than once.

5. The apparatus of claim 1, wherein first mesh network switch predetermines a plurality of redundant unicast paths between the first mesh network switch and a second mesh network switch of the plurality of mesh network switches.

6. The apparatus of claim 5, wherein the plurality of redundant unicast paths between the first mesh network switch and the second mesh network switch comprise a subset of a plurality available paths between the first mesh network switch and the second mesh network switch.

7. The apparatus of claim 5, wherein the first mesh network switch assigns a unique identifier to each of the plurality of redundant unicast paths;
wherein one or more mesh network switches that comprise the second mesh network switch reside in a specific path, wherein the first mesh network switch notifies the one or more mesh network switches of the unique identifier of the specific path.

8. The apparatus of claim 7, wherein the first mesh network switch inserts a mesh tag into the path verification request, wherein the mesh tag comprises the unique identifier of the specific path to route the packet from the first mesh network switch along the specific path to the second mesh network switch.

9. The apparatus of claim 5, wherein the first mesh network switch directs a path verification request along each of the plurality of redundant unicast paths to the second mesh network switch to test operability of each of the plurality of redundant unicast paths.

10. The apparatus of claim 1 in combination with the plurality of mesh network switches, wherein the plurality of mesh network switches comprises second and third mesh network switches, wherein the third mesh network switch is located between the first and second mesh network switches in the specific broadcast path;
wherein the first mesh network switch directs the broadcast path verification request along the specific broadcast path through the third mesh network switch to the second mesh network switch, wherein the third mesh network switch verifies whether path connection information of the broadcast path verification request is correct.

11. The apparatus of claim 10, wherein the third mesh network switch verifies whether the path connection information of the broadcast path verification request matches outgoing port information stored by the third mesh network switch in one or more forwarding tables.

12. The apparatus of claim 10, wherein if the path connection information of the path broadcast verification request is correct, then the third mesh network switch sends the broadcast path verification request along the specific broadcast path to the second mesh network switch.

13. The apparatus of claim 10, wherein if the path connection information of the broadcast path verification request is incorrect, then the third mesh network switch sends an invalid path response to the first mesh network switch, wherein the invalid path response indicates non-operability of the specific broadcast path.

14. The apparatus of claim 13, wherein upon receipt of the invalid path response, the first mesh network switch discontinues use of the specific broadcast path for transmission of data packets to the second mesh network switch.

15. The apparatus of claim 13, wherein upon receipt of the invalid path response, the first mesh network switch broadcasts a path removal packet to the second and third mesh network switches; wherein the path removal packet indicates to the second and third mesh network switches to remove a unique identifier of the specific broadcast path from one or more mesh forwarding tables.

16. The apparatus of claim 1, wherein the broadcast path verification request comprises a first broadcast path verification request, wherein the first mesh network switch periodically sends subsequent broadcast path verification requests along the specific broadcast path to the second mesh network switch to periodically test operability of the specific broadcast path.

17. The apparatus of claim 1, wherein the broadcast path verification request tests performance characteristics of the specific broadcast path;
wherein the first mesh network switch sends the broadcast path verification request to trigger a broadcast path verification acknowledgement from a second mesh network switch, the plurality of mesh network switches, to the first mesh network switch back along the specific broadcast path;
wherein the broadcast path verification acknowledgement from the second mesh network switch returns performance results to the first mesh network switch.

18. The apparatus of claim 1, wherein a set of mesh network switches comprise the plurality of mesh network switches and the first mesh switch, wherein the broadcast path verification request comprises a first broadcast path verification request, wherein the specific broadcast path comprises a first specific broadcast path,
wherein any one of the plurality of mesh network switches may direct a second broadcast path verification request along a second specific broadcast path to set of mesh network switches to test operability of the second specific broadcast path.

19. The apparatus of claim 1, wherein the first mesh network switch replicates a second broadcast path verification request and sends the second broadcast path verification request along a specific second broadcast path, of the plurality of redundant broadcast paths, to each of the plurality of mesh network switches to trigger path verification acknowledgements from the plurality of mesh network switches back along the specific second broadcast path to test operability of the specific second broadcast path;
wherein the first mesh network switch makes a determination that the specific second broadcast path is valid as operable for transmission of data packets to the plurality of mesh network switches, upon receipt of a second path verification acknowledgement within the predetermined amount of time from each of the plurality of mesh network switches in response to the second broadcast path verification request;
wherein the first mesh network switch makes a determination that the specific second broadcast path is invalid as inoperable for transmission of data packets to the plurality of mesh network switches, upon failure of receipt of the second path verification acknowledgement within the predetermined amount of time from any of the plurality of mesh network switches in response to the second broadcast path verification request.

20. The apparatus of claim 19, wherein the first mesh network switch sends the second broadcast path verification request to trigger a first broadcast path verification acknowledgement from a second mesh network switch, of the plurality of mesh network switches, to the first mesh network switch back along the specific second broadcast path;
wherein the first mesh network switch sends the second broadcast path verification request to trigger a second broadcast path verification acknowledgement from a third mesh network switch, of the plurality of mesh network switches, to the first mesh network switch back along the specific second broadcast path;
wherein receipt of the first and second broadcast path verification acknowledgements by the first mesh network switch within the predetermined amount of time indicates operability of the specific broadcast path to the second and third mesh network switches.

21. A method, comprising the steps of:
predetermining a plurality of redundant broadcast paths to a plurality of mesh network switches;
replicating a broadcast path verification request and sending the broadcast path verification request along a specific broadcast path, of the plurality of redundant broadcast paths, to each of the plurality of mesh network switches to trigger path verification acknowledgements from the plurality of mesh network switches back along the specific broadcast path to test operability of the specific broadcast path;
confirming operability of the specific broadcast path for transmission of data packets to the plurality of mesh network switches, upon receipt of a broadcast path verification acknowledgement within a predetermined amount of time from each of the plurality of mesh network switches in response to the broadcast path verification request; and
making a determination that the specific broadcast path is invalid as inoperable for transmission of data packets to the plurality of mesh network switches, upon failure of receipt of the path verification acknowledgement within the predetermined amount of time from any of the plurality of mesh network switches in response to the broadcast path verification request.

22. The method of claim 21, wherein the step of replicating the broadcast path verification request and sending the broadcast path verification request along the specific broadcast path to each of the plurality of mesh network switches to trigger path verification acknowledgements from the plurality of mesh network switches back along the specific broadcast path to test operability of the specific broadcast path comprises the step of:
testing operability of the specific broadcast path by inserting a mesh tag associated with the specific broadcast path into the broadcast path verification request to route the broadcast path verification request along the specific broadcast path.

23. The method of claim 21, further comprising the steps of:
predetermining a plurality of redundant unicast paths to a mesh network switch, of the plurality of mesh network switches, wherein the plurality of redundant unicast paths comprise a specific path;
assigning a unique path identifier to each of the plurality of redundant unicast paths; and
employing the unique path identifier of the specific path to route the path verification request along the specific path to test operability of the specific path.

24. The method of claim 21, further comprising the step of:
periodically sending subsequent broadcast path verification requests along the specific broadcast path to the plurality of mesh network switches to periodically test operability of the specific broadcast path.

25. The method of claim 21, replicating a second broadcast path verification request and sending the second broadcast path verification request along a specific second broadcast path, of the plurality of redundant broadcast paths, to each of the plurality of mesh network switches to test operability of the specific second broadcast path;
confirming operability of the specific second broadcast path for transmission of data packets to the plurality of mesh network switches, upon receipt of a second broadcast path verification acknowledgement within the predetermined amount of time from each of the plurality of mesh network switches in response to the second broadcast path verification request; and
making a determination that the specific second broadcast path is invalid as inoperable for transmission of data packets to the plurality of mesh network switches, upon failure of receipt of the second path verification acknowledgement within the predetermined amount of time from any of the plurality of mesh network switches in response to the second broadcast path verification request.

26. The method of claim 25, further comprising the steps of:
receiving the second broadcast path verification acknowledgement within the predetermined amount of time from each of the plurality of mesh network switches in response to the second broadcast path verification request when the specific second broadcast path is valid as operable for transmission of data packets to the plurality of mesh network switches; and
making a determination of a lack of receipt of the second path verification acknowledgement within the predetermined amount of time from one or more of the plurality of mesh network switches in response to the second broadcast path verification request when the specific second broadcast path is invalid as inoperable for transmission of data packets to the plurality of mesh network switches.

27. An apparatus, comprising:
means for determining a plurality of redundant broadcast paths to a plurality of mesh network switches;
means for replicating a first broadcast path verification request and sending the first broadcast path verification request along a specific first broadcast path, of the plurality of redundant broadcast paths, to each of the plurality of mesh network switches to verify whether path connection information of the first broadcast path verification request is correct; and
means for replicating a second broadcast path verification request and sending the second broadcast path verification request along a specific second broadcast path of the plurality of redundant broadcast paths, to each of the plurality of mesh network switches to verify whether path connection information of the second broadcast path verification request is correct.

28. The apparatus of claim 27, further comprising:
means for sending an invalid path response to an owner mesh network switch of the specific first broadcast path that indicates non-operability of the specific first broadcast path if the path connection information of the first broadcast path verification request is incorrect;

means for sending an invalid path response to an owner mesh network switch of the specific second broadcast path that indicates non-operability of the specific second broadcast path if the path connection information of the second broadcast path verification request is incorrect.

29. The apparatus of claim 28, further comprising:

means for discontinuing use of the specific first broadcast path for transmission of data packets to the plurality of mesh network switches upon receipt of the invalid path response by the owner mesh network switch of the specific first broadcast path;

means for broadcasting a path removal packet to the plurality of mesh network switches upon receipt of the invalid path response by the owner mesh network switch of the specific first broadcast path, to indicate to the plurality of mesh network switches to remove a unique identifier of the specific first broadcast path from one or more mesh forwarding tables.

30. An article, comprising:

one or more computer-readable signal-bearing media; and means in the one or more media for predetermining a plurality of redundant broadcast paths to a plurality of mesh network switches;

means in the one or more media for replicating a broadcast path verification request and sending the broadcast path verification request along a specific broadcast path, of the plurality of redundant broadcast paths, to each of the plurality of mesh network switches to trigger path verification acknowledgements from the plurality of mesh network switches back along the specific broadcast path to test operability of the specific broadcast path.

* * * * *